W. B. QUICK.

Improvement in Gang-Plows

No. 115,639.  Patented June 6, 1871.

Witnesses:
Robert Burns

Inventor:
William B. Quick

UNITED STATES PATENT OFFICE.

WILLIAM B. QUICK, OF BELLEVILLE, ILLINOIS.

IMPROVEMENT IN GANG-PLOWS.

Specification forming part of Letters Patent No. 115,639, dated June 6, 1871.

*To all whom it may concern:*

Be it known that I, WILLIAM B. QUICK, of Belleville, in the county of St. Clair and State of Illinois, have made a certain new and useful Improved Gang-Plow; and I do hereby declare that the following is a full and true description thereof, reference being had to the accompanying drawing and to the letters of reference marked thereon.

This invention relates chiefly to the peculiar arrangement and combination of parts forming a locking device by which the plows can be retained in position so as to plow in a uniform depth, as will now more fully be described.

To enable those herein skilled to make and use my said improved gang-plow, I will now more fully describe the same, referring to the accompanying—

Figure 1:
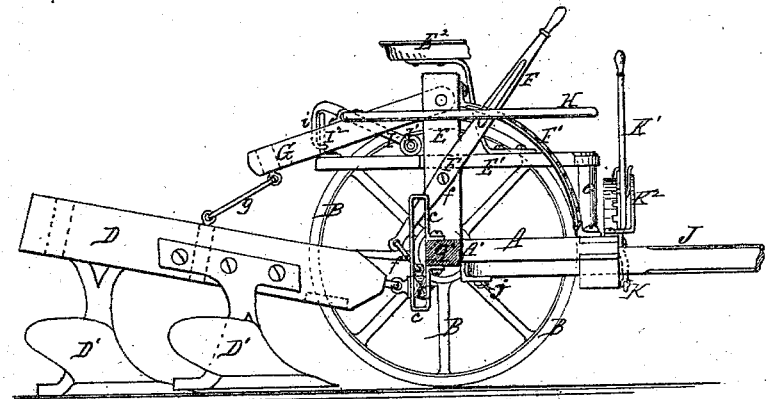
Figure 2:
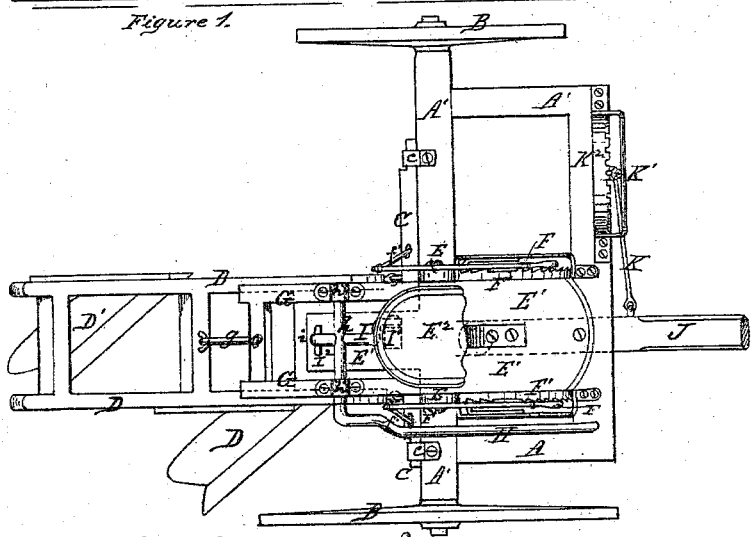
Figure 3:
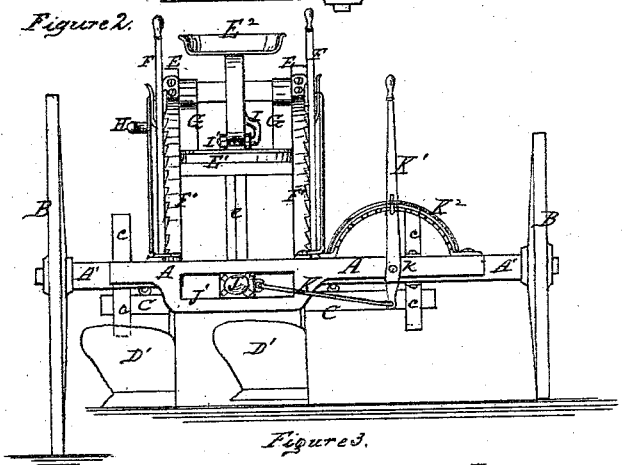

Figure 1 as a sectional elevation, to Fig. 2 as a top plan, and to Fig. 3 as a front elevation.

Same letters indicate same parts in the different figures.

In said figures, A is the frame, secured to axle A', which is supported upon wheels B in manner usual. Secured to the rear of axle A' are guides $c$, in which the slide-bar C is fitted to slide, and to which I hinge in any proper manner the plow-beams D, carrying plows D'. The seat-frame E I secure to axle A'. Between said frame I have arranged and supported a foot-board, $E^1$, propped by a prop, $e$, and extending somewhat back of seat-frame, as shown in Figs. 1 and 2. The foot-board $E^1$ carries seat $E^2$, secured to a spring-bar in manner usual. In order to gage the depth of the plows I have attached to the seat-frame E, on both sides, the hand-levers F, pivoted at $f$, and connecting by links $f'$ to the slide-bar C, said levers operating and engaging in notched segments F', secured to seat-frame E and frame A, as clearly shown in Fig. 1. To the top of seat-frame E I have hinged a movable frame, G, and connected same, by link or rod attachment, $g$, to plow-beams D so as to raise same. In order to retain the plows in required position so as to plow in a uniform depth, (when said plows are gaged as to depth,) I have provided the movable frame G with a rod which forms a hand-lever, H, and shaft $h$, secured in journals $h'$ to said frame, in manner shown in Fig. 2. To said shaft $h'$ I secure the rod I, carrying at its end a friction-roller, $I^1$, and bent at $i$ so as to form a hook to engage in a slotted standard, $I^2$, secured to foot-board $E^1$. (See Figs. 1 and 2.) The operator or plowman, lifting hand-lever H, can thus readily lock the plows in position to plow in a steady plane by causing the hooked lever I to engage in the slots of standard $I^2$. The tongue J I pivot to a clevis-joint, $j$, to axle A'. To the front of frame A I secure a slotted frame, J', through which the tongue passes and is supported. The angular movement is imparted to the frames and plows by a connecting-rod, K, secured to tongue J, and the end of a hand-lever, $K^1$, pivoted at $k$, and operating in a notched segment-bar, $K^2$, secured to frame A, as clearly shown in Fig. 3. It is plain that the operator moving the hand-lever $K^1$ can thus readily vary, laterally, the frame and plows, so as to take as much or as little land as desired.

Having thus fully described my said invention, what I claim is—

The combination and arrangement of the seat-frame E, foot-board $E^1$, movable frame G connected to plow-beams D, lever-shaft H carrying hook-rod I, with friction-roller $I^2$, substantially as and for the purpose specified.

In testimony of said invention I have hereunto set my hand.

WILLIAM B. QUICK.

Witnesses:
WILLIAM W. HERTHEL,
J. W. HERTHEL.